US009144867B2

(12) United States Patent
Li et al.

(10) Patent No.: US 9,144,867 B2
(45) Date of Patent: Sep. 29, 2015

(54) CLAMPING MECHANISM

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Bing Li, Shenzhen (CN); Bo Yang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 238 days.

(21) Appl. No.: 13/955,267

(22) Filed: Jul. 31, 2013

(65) Prior Publication Data
US 2014/0048995 A1    Feb. 20, 2014

(30) Foreign Application Priority Data

Aug. 14, 2012 (CN) .......................... 2012 1 0287844

(51) Int. Cl.
| | |
|---|---|
| *B23Q 1/03* | (2006.01) |
| *B23Q 3/06* | (2006.01) |
| *B25B 5/14* | (2006.01) |

(52) U.S. Cl.
CPC ........ *B23Q 1/03* (2013.01); *B23Q 3/062* (2013.01); *B25B 5/142* (2013.01)

(58) Field of Classification Search
CPC ............ B25B 1/02; B25B 5/02; B25B 5/142; B23Q 1/03; B23Q 3/062
USPC .......... 269/107, 108, 109, 111, 112, 153, 157
See application file for complete search history.

(56) References Cited

U.S. PATENT DOCUMENTS

| | | | | |
|---|---|---|---|---|
| 119,151 | A * | 9/1871 | Johnson | 269/87.2 |
| 167,127 | A * | 8/1875 | Sandbach | 269/203 |
| 500,364 | A * | 6/1893 | Baker | 269/55 |
| 1,966,338 | A * | 7/1934 | Eggimann | 269/107 |
| 1,966,391 | A * | 7/1934 | Hill | 269/108 |
| 8,789,825 | B2 * | 7/2014 | Li et al. | 269/218 |
| 2014/0048995 | A1 * | 2/2014 | Li et al. | 269/153 |

FOREIGN PATENT DOCUMENTS

GB    1447643 A    8/1976

* cited by examiner

*Primary Examiner* — Lee D Wilson
*Assistant Examiner* — Jamal Daniel
(74) *Attorney, Agent, or Firm* — Novak Druce Connolly Bove + Quigg LLP

(57) ABSTRACT

A clamping mechanism includes a mounting plate, a driving assembly, and a clamping assembly. The mounting plate defines four through grooves. The driving assembly includes a driver mounted on the mounting plate, and a connecting member connected to the driver. The clamping assembly includes a reversing member mounted on the mounting plate, four clamping members, four transferring members, and four elastic members. The clamping members are movably mounted in the through grooves. The transferring members are wound on the reversing member. An end of each transferring member is connected to the connecting member, an opposite end of each transferring member is connected to the corresponding clamping member. The elastic members are sleeved on the transferring members, and resisting against the clamping members. The clamping members move toward the reversing member driven by the driver, for clamping a workpiece.

20 Claims, 5 Drawing Sheets

CLAMPING MECHANISM

BACKGROUND

1. Technical Field

The present disclosure relates to clamping mechanisms, and particularly to a clamping mechanism having a slim profile for automatically clamping a workpiece.

2. Description of Related Art

In automated machining processes, a clamping mechanism may be configured for feeding or transferring workpieces. However, when a work space for clamping is small or tight, such as a feeding space of a vertical injection molding machine, for example, and thus a miniature or slim profiled clamping mechanism is needed. A vacuum chuck may be thin enough, but a clamping surface of the workpiece is relatively rough, thus, the vacuum chuck cannot be applied in many of the corresponding clamping processes.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
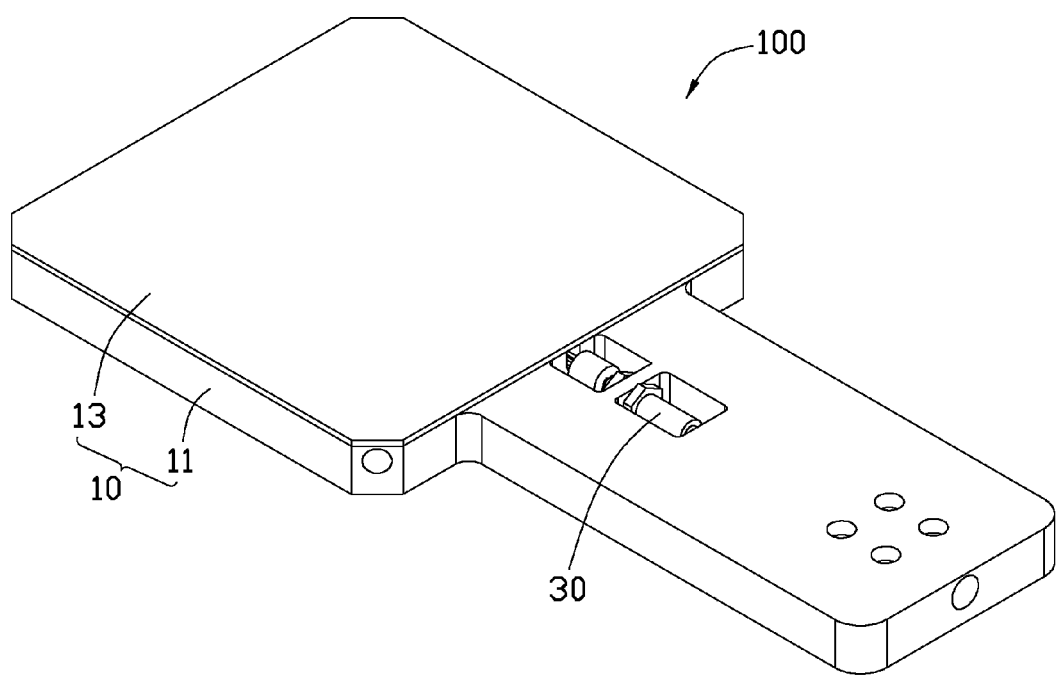
FIG. 1 is an isometric view of an embodiment of a clamping mechanism.
Figure 2:
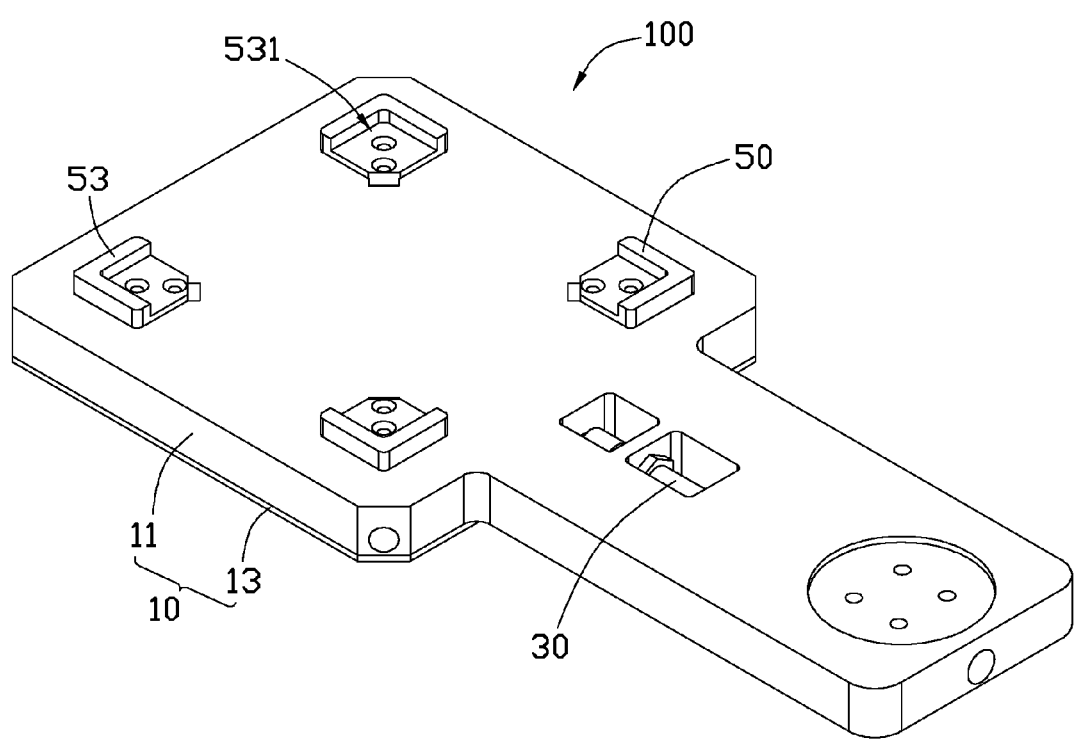
FIG. 2 is similar to FIG. 1, but viewed in another aspect.

FIGS. 1 and 2 show one embodiment of a clamping mechanism 100. The clamping mechanism 100 includes a mounting assembly 10, a driving assembly 30, and a clamping assembly 50. The driving assembly 30 and the clamping assembly 50 are mounted within the mounting assembly 10. The driving assembly 30 drives the clamping assembly 50 to clamp a workpiece (not shown in the figures).

Figure 3:
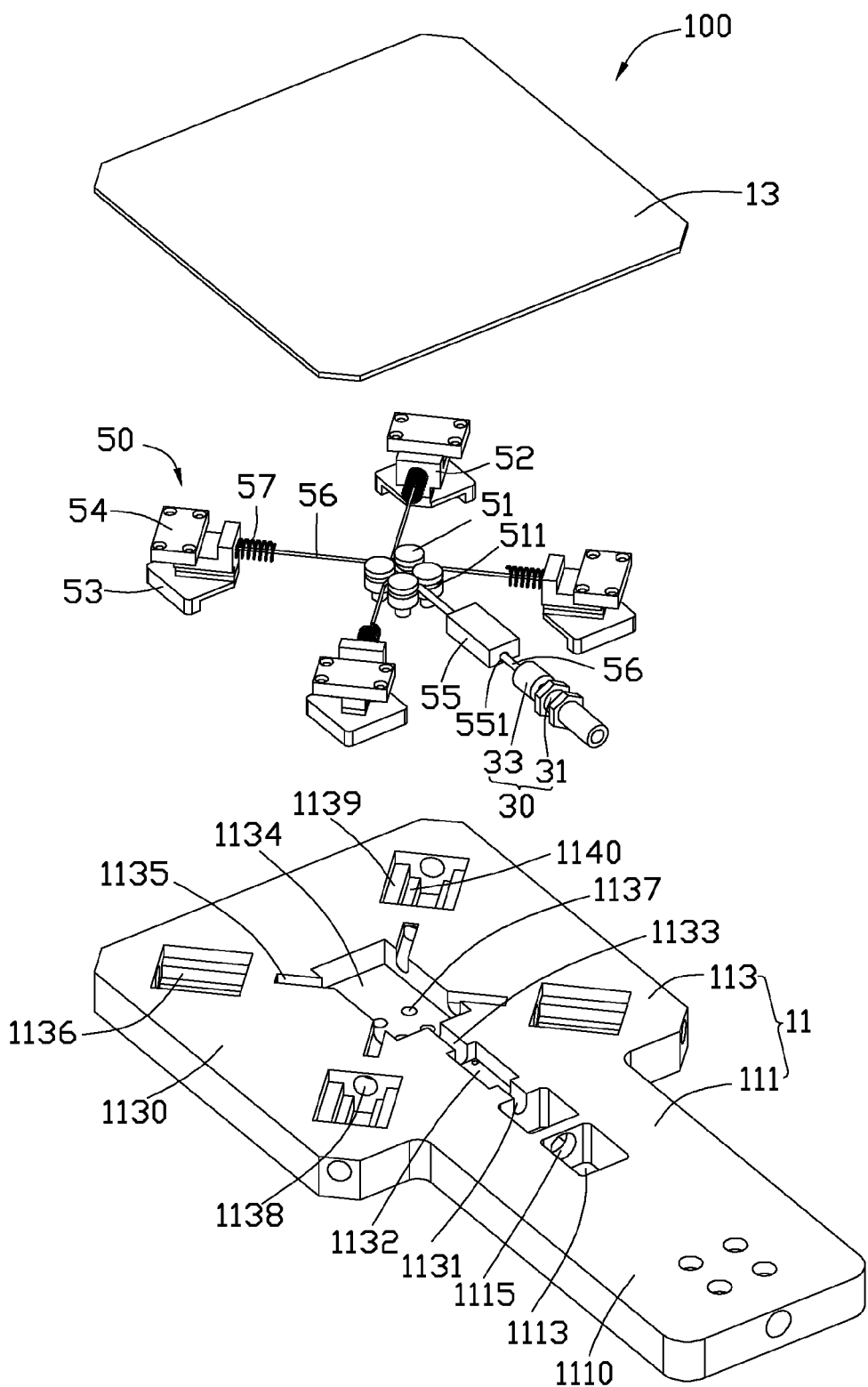
FIG. 3 is an exploded, isometric view of the clamping mechanism shown in FIG. 1.
Figure 4:
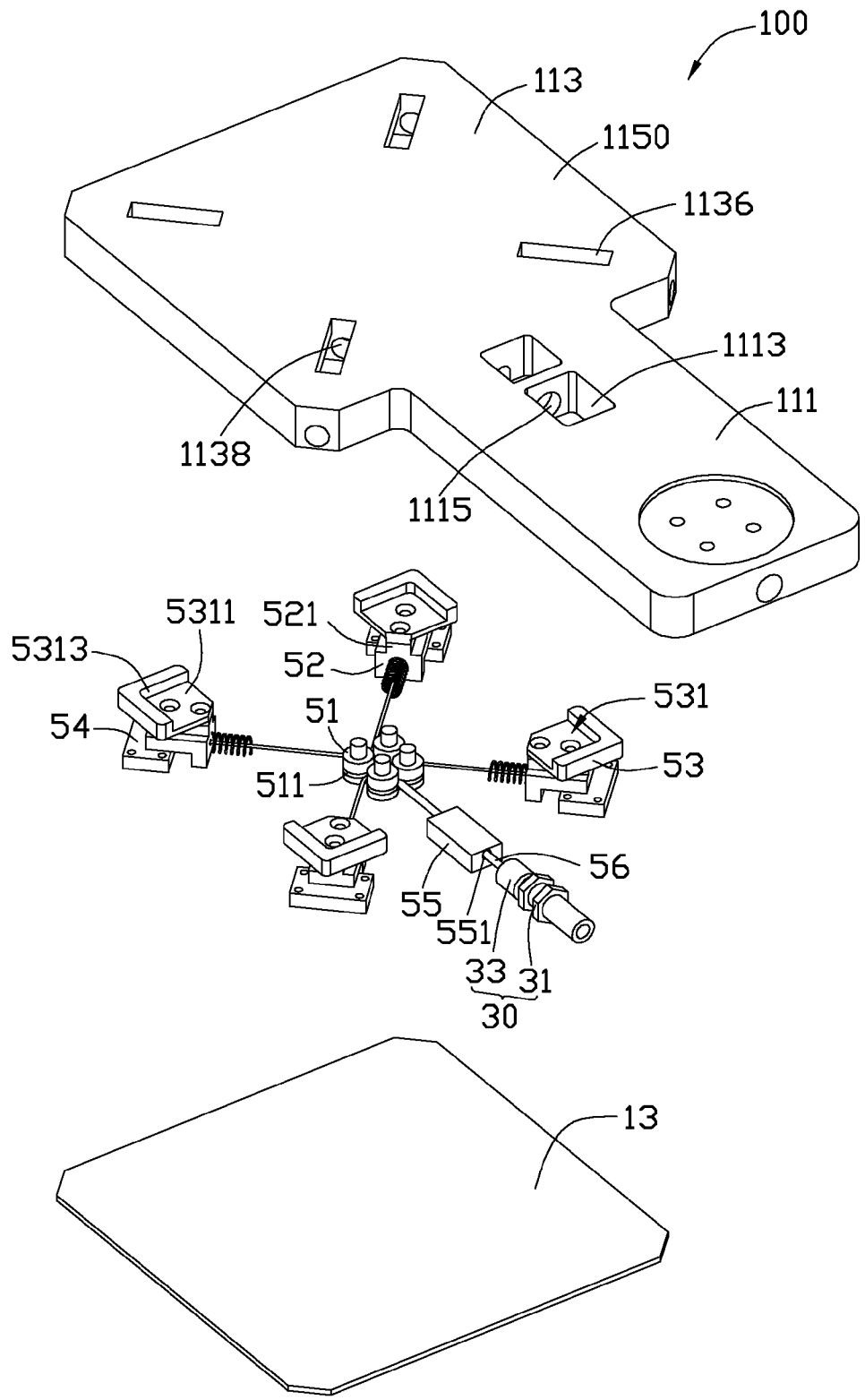
FIG. 4 is similar to FIG. 3, but shown in another aspect.
Figure 5:
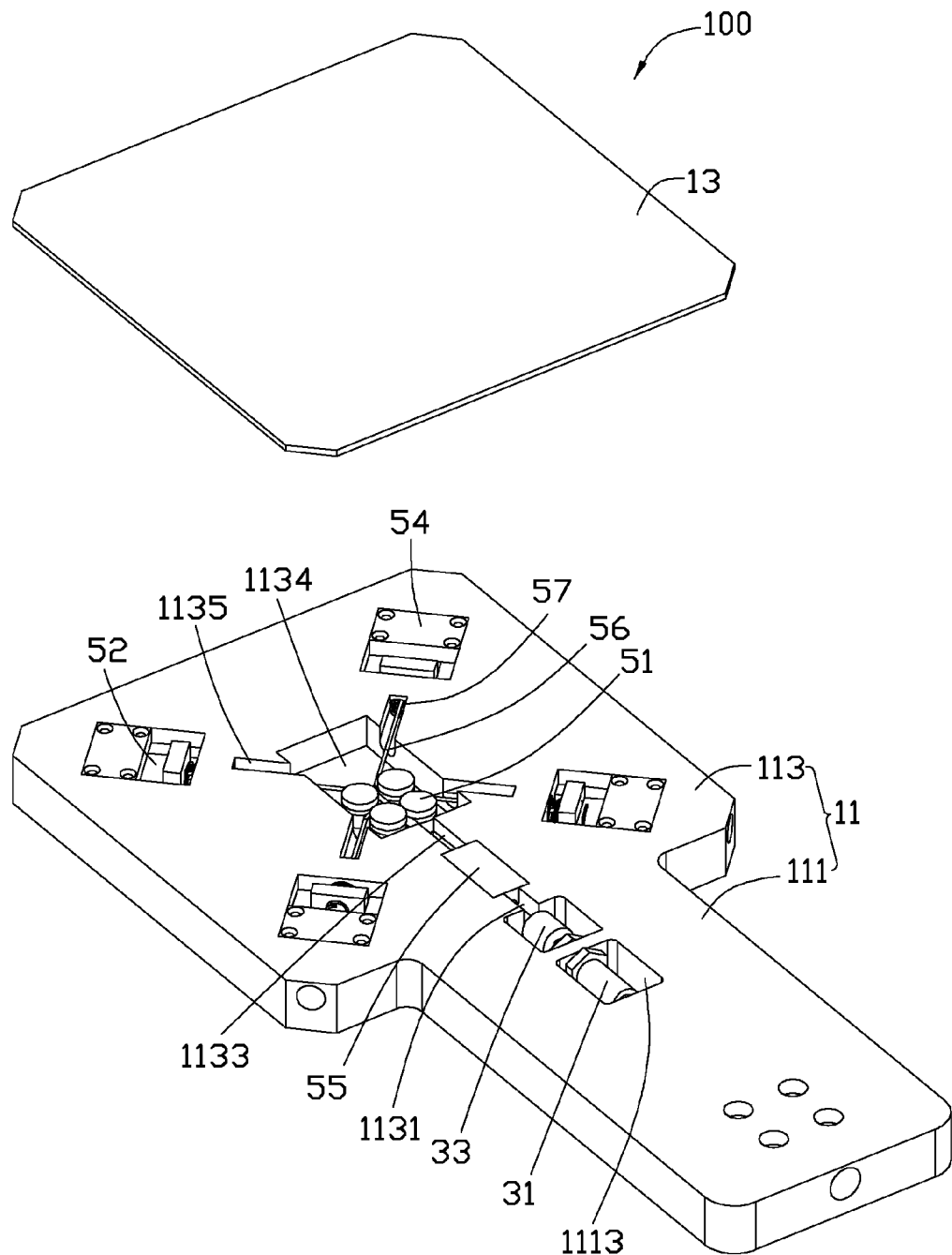
FIG. 5 is a partly assembled, isometric view of the clamping mechanism shown in FIG. 1.

FIGS. 3 to 5 show the mounting assembly 10, the driving assembly 30 and the clamping assembly 50 in detail. The mounting assembly 10 includes a mounting plate 11 and a cover 13 mounted on the mounting plate 11. The mounting plate 11 includes a first installation portion 111 and a second installation portion 113 extending from the installation portion 111. The first installation portion 111 is coplanar with the second installation portion 113. The first installation portion 111 is substantially rectangular. The second installation portion 113 is substantially square.

The first installation portion 111 includes an installing surface 1110 on a side surface thereof. The installing surface 1110 defines a pair of engaging grooves 1113 at an end thereof adjacent to the second installation portion 113. The pair of engaging grooves 1113 are positioned along a longitudinal direction of the first installation portion 111. An inner sidewall of the first installation portion 111 in one of the engaging grooves 1113 defines a through hole 1115 therethrough. The through hole 1115 communicates the pair of engaging grooves 1113, and an axis of the through hole 1115 is parallel to the longitudinal direction of the first installation portion 111.

The second installation portion 113 includes a first mounting surface 1130 and a second mounting surface 1150 opposite to the first mounting surface 1130. The first mounting surface 1130 is coplanar with the installing surface 1110. The first mounting surface 1130 defines a first mounting groove 1131, a second mounting groove 1132, a third mounting groove 1133, a fourth mounting groove 1134, four fifth mounting grooves 1135, and four through grooves 1136. The first mounting groove 1131 is substantially a slot, and aligned with the through hole 1115. The first mounting groove 1131 communicates with one of the engaging grooves 1113 adjacent to the second installation portion 113. The second mounting groove 1132 is substantially rectangular, and is positioned in a side of the first mounting groove 1131 away from the engaging grooves 1113, and communicates with the first mounting groove 1131. A width and a depth of the second mounting groove 1132 are greater than a width and a depth of the first mounting groove 1131, respectively. The third mounting groove 1133 communicates with the second mounting groove 1132, and is positioned in a side of the second mounting groove 1132 away from the first mounting groove 1131. The third mounting groove 1133 is substantially a slot, and is aligned with the first mounting groove 1131.

The fourth mounting groove 1134 is substantially rectangular, and is substantially positioned at a center of the second installation portion 113. The fourth mounting groove 1134 communicates with an end of the third mounting groove 1133 away from the second mounting groove 1132. The first mounting groove 1131, the second mounting groove 1132, the third mounting groove 1133, and the fourth mounting groove 1134 are substantially positioned along a straight line, and communicate in that order. A bottom surface of the fourth mounting groove 1134 defines four first mounting holes 1137 (two of the first mounting holes are partly blocked from full view by the second installation portion 113 in FIG. 3).

The fifth mounting grooves 1135 are substantially slots, and are arranged at a periphery of the fourth mounting groove 1134. Each of the fifth mounting grooves 1135 communicates with the fourth mounting groove 1134, respectively. In the illustrated embodiment, the fifth mounting grooves 1135 are symmetrically arranged at opposite sides of the fourth mounting groove 1134. Two opposite fifth mounting grooves 1135 are arranged in a first straight line, another two opposite fifth mounting grooves 1135 are arranged in a second straight line, and the first straight line intersects with the second straight line.

Each of the through grooves 1136 is defined in a side of one corresponding fifth mounting groove 1135 away from the fourth mounting groove 1134. Two of the through grooves 1136 are positioned along the first straight line, and the other two of the through grooves 1136 are positioned along the second straight line. An inner sidewall in the through groove 1136 adjacent to the corresponding fifth mounting groove 1135 defines a second mounting hole 1138. The second mounting hole 1138 is aligned with the corresponding fifth mounting groove 1135, and communicates with the corresponding fifth mounting groove 1135. A diameter of the second mounting hole 1138 is larger than a width of the fifth mounting groove 1135, thus a resisting wall (not shown in the figures) is formed at an intersection portion of the second mounting hole 1138 and the corresponding fifth mounting groove 1135. The through groove 1136 is substantially stepped, and thus a first assembling surface 1139 and a second assembling surface 1140 are formed in the through groove 1136. The first assembling surface 1139 is parallel to the second assembling surface 1140, and the first assembling surface 1139 is located closer to the first mounting surface 1130 relative to the second assembling surface 1140.

The driving assembly 30 includes a driver 31, and a connecting member 33 connected to the driver 31. The driver 31 is inserted into the through hole 1115, and is received in the engaging grooves 1113. The connecting member 33 is connected to one end of the driver 31 adjacent to the second installation portion 113, and is received in one of the engaging grooves 1113 adjacent to the second installation portion 113. The driver 31 is capable of moving the connecting member 33. In the illustrated embodiment, the driver 31 is a cylinder.

The clamping assembly 50 includes four reversing members 51, four linking members 52, four clamping members 53, four cover plates 54, an aligning member 55, four transferring members 56, and four elastic members 57. The reversing members 51 are cylindrical, and are rotatably and respectively mounted within the first mounting holes 1137. Each of the reversing members 51 defines an annular groove 511 at an outer sidewall thereon.

The linking members 52 are substantially cubic, are slidably mounted on the second assembling surfaces 1140, and received in the through grooves 1136, respectively. A protruding portion 521 protrudes from a side of each linking member 52. The protruding portion 521 in the corresponding through groove 1136 is coplanar with the second mounting surface 1150. The clamping members 53 are located at a side of the second mounting surface 1150 corresponding to the through grooves 1136, and are connected to the protruding portions 521, respectively. Each clamping member 53 defines a latching groove 531 (shown in FIG. 4) at a side surface thereof, for latching and positioning the workpiece. A bottom surface 5311 and a sidewall 5313 extending from the bottom surface 5311 along a direction away from the second installation portion 113 define the latching groove 531, cooperatively. A cross-section of the sidewall 5313 is substantially L-shaped. Four sidewalls 5313 together are substantially four corners of a rectangle. The cover plates 54 are substantially cubic, and are positioned on the first assembling surface 1139 corresponding to the through grooves 1136, for respectively covering the through grooves 1136.

The aligning member 55 is substantially cubic, and is fixed within the second mounting groove 1132. The aligning member 55 defines a through hole 551. The through hole 551 is aligned with the first mounting groove 1131 and the third mounting groove 1133. The transferring members 56 are flexible strips. An end of each transferring member 56 is connected to the connecting member 33 of the driving assembly 30, an opposite end thereof is connected to an end of one corresponding linking member 52 adjacent to the fifth mounting groove 1135. Each transferring member 56 is wound in the annular groove 511 of one corresponding reversing member 51, which enables each transferring member 56 to change moving direction and connect with the corresponding linking member 52. A portion of the transferring member 56 located between the reversing member 51 and the connecting member 33 is received in the first mounting groove 1131, the through hole 551, and the third mounting groove 1133. A portion of the transferring member 56 located between the reversing member 51 and the linking member 52 is received in the fifth mounting groove 1135 and the second mounting hole 1138.

The elastic members 57 are respectively sleeved on an end of the transferring members 56 adjacent to the corresponding linking members 52. An end of each elastic member 57 is received in the second mounting hole 1138, and resists against the corresponding resisting wall of the second installation portion 113. An opposite end of the elastic member 57 is received in the through groove 1136, and resists against the corresponding linking member 52. In the illustrated embodiment, the transferring members 56 are flexible steel wires. The elastic members 57 are springs.

In assembly, the driver 31 is mounted in the through hole 1115, and the connecting member 33 faces the first mounting groove 1131. The linking members 52 are respectively mounted on the second assembling surfaces 1140. The clamping members 53 are respectively mounted on the protruding portions 521. The reversing members 51 are respectively mounted in the first mounting hole 1137. The aligning member 55 is mounted in the second mounting groove 1132. An end of each transferring member 56 is connected to the connecting member 33. The opposite end of each transferring members 56 passes through the first mounting groove 1131, the through hole 551, and the third mounting groove 1133, and then wound on the corresponding reversing member 51, and then passes through the corresponding fifth mounting groove 1135 and the corresponding second mounting hole 1138. The elastic members 57 are sleeved on the transferring members 56, and then the free ends of the transferring members 56 are respectively connected to the linking members 52. The cover plates 54 are mounted on the first assembling surface 1139, and covering the through grooves 1136. The cover 13 is mounted on the first mounting surface 1130, and covers the grooves defined on the first mounting surface 1130.

In use, the clamping mechanism 100 is connected to a robot arm (not shown in FIGS.) in the illustrated embodiment. The robot arm is connected to an end of the installing surface 1110 of the mounting plate 11 away from the second installation portion 113. The robot arm moves the clamping mechanism 100 to be located above a workpiece, and four corners of the workpiece are respectively received in the latching grooves 531. The sidewalls 5313 abut against four corners of the workpiece. The driver 31 drives the connecting member 33 to move towards the driver 31, and the connecting member 33 pulls the transferring members 56, and thus the linking members 52 move along the corresponding second assembling surface 1140 under a pulling force applied by the corresponding transferring member 56. The clamping members 53 are driven to move towards the reversing members 51, and thereby clamping the workpiece. At that moment, the elastic members 57 are compressed. When the robot arm moves the workpiece to a feeding position, for example, when the driver 31 releases the connecting member 33, and then the elastic members 57 are released. The elastic members 57 exert elastic forces to the linking members 52, to enable the linking members 52 to recover or return back to an original position. Thus, the clamping members 53 are recovered or returned to an original position before clamping the workpiece.

In an alternative embodiment, the reversing members 51 may be respectively fixed on the first mounting holes 1137, and the transferring members 56 are configured to slide along the outer sidewall of the reversing members 51. The aligning member 55 may be omitted, and then the transferring members 56 are partly received in a receiving groove including the first mounting groove 1131, the second mounting groove 1132, and the third mounting groove 1133. The through groove 1136 may not be stepped, and then the linking members 52 may be mounted on the first mounting surface 1130 corresponding to the through groove 1136.

In an alternative embodiment, the first mounting groove 1131, the second mounting groove 1132, the third mounting groove 1133, the fourth mounted groove 1134, the fifth mounting grooves 1135, the first mounting holes 1137, the second mounting holes 1138, the cover plates 54, the linking members 52, the aligning member 55, and the cover 13 may be omitted, and then the driving assembly 30 and the reversing members 51 are mounted on the first mounting surface 1130. The clamping members 53 may be received in the through grooves 1136, and connected to the transferring members 56. The elastic members 57 resist the clamping members 53 and the second installation portion 113.

In an alternative embodiment, a number of the clamping members 53 may be two or more than two, and a number of the reversing members 51, the linking members 52, the cover plate 54, the transferring member 56, the elastic member 57, the fifth mounting groove 1135, and the through groove 1136 are correspondingly two or more than two. A shape of the latching groove 531 may be other shapes corresponding to the workpiece. In an alternative embodiment, the annular groove 511 may be omitted, and then the transferring members 56 are wound on the outer sidewalls of the reversing members 51. In an alternative embodiment, there may only be one reversing member 51, and the reversing member 51 defines a plurality of annular grooves 511 at the outer sidewall thereof, for receiving the transferring members 56. The linking member 52 and the corresponding clamping member 53 may be integrally formed to be one piece.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A clamping mechanism, for clamping a workpiece, comprising:
    a mounting plate defining at least two through grooves;
    a driving assembly comprising a driver, and a connecting member connected to an end of the driver, the driver mounted on the mounting plate, for moving the connecting member; and
    a clamping assembly comprising:
        a reversing member mounted on the mounting plate;
        at least two clamping members movably mounted in the at least two through grooves of the mounting plate, respectively;
        at least two transferring members movably wound on the reversing member, an end of each of the at least two transferring members connected to the connecting member, an opposite end of each of the at least two transferring members connected to one of the at least two clamping members, thereby having the reversing member capable of changing a moving direction of each of the at least two transferring members; and
        at least two elastic members sleeved on the at least two transferring members, and respectively resisting against the at least two clamping members,
    wherein when the driver moves the connecting member, the connecting member pulls the at least two transferring members, and thus a pulling force is applied on each of the at least two clamping members, the at least two clamping members move toward the reversing member driven by the pulling force, to clamp the workpiece.

2. The clamping mechanism of claim 1, wherein the mounting plate comprises a first installation portion and a second installation portion extending from the first installation portion, the driver is mounted on the first installation portion, the reversing member and the at least two clamping members are mounted on the second installation portion.

3. The clamping mechanism of claim 2, wherein the second installation portion comprising a first mounting surface and a second mounting surface opposite to the first mounting surface, the reversing member is mounted on the first mounting surface, the clamping assembly further comprises at least two linking members respectively connected to the at least two clamping members, the at least two linking members are mounted on the first mounting surface respectively received in the at least two through grooves of the mounting plate, the at least two clamping members are positioned on the second mounting surface respectively corresponding to the at least two through grooves, an end of each of the at least two transferring members away from the connecting member is connected to the corresponding linking member.

4. The clamping mechanism of claim 3, wherein the at least two through grooves are stepped grooves, a first assembling surface and second assembling surface parallel to the first assembling surface are formed within each of the at least two through grooves, the first assembling surface is located closer to the first mounting surface relative to the second assembling surface, and the linking member is slidably mounted on the second assembling surface.

5. The clamping mechanism of claim 3, wherein the first mounting surface defines a first mounting groove, a second mounting groove, a third mounting groove, a fourth mounting groove, and at least two fifth mounting grooves, an end of the first mounting groove is positioned adjacent to the connecting member, the first mounting groove, the second mounting groove, the third mounting groove, and the fourth mounting groove communicate in that order, and are arranged in a straight line, an end of each of the at least two fifth mounting grooves communicates with the fourth mounting groove, an opposite end of each of the at least two fifth mounting grooves extends to the corresponding linking member, a bottom surface of the fourth mounting groove defines a first mounting hole, the reversing member is mounted in the first mounting hole, a portion of each of the at least two transferring members between the reversing member and the connecting member is received in the first mounting groove, the second mounting groove, and the third mounting groove; a portion of each of the at least two transferring members between the reversing member and the linking member is received in the corresponding fifth mounting groove.

6. The clamping mechanism of claim 5, wherein the clamping assembly further comprises an aligning member mounted in the second mounting groove, the aligning member defines a through hole aligning with the first mounting groove and the third mounting groove, the at least two transferring members is inserted into the through hole.

7. The clamping mechanism of claim 6, wherein the mounting plate defines a second mounting hole at a sidewall in each of the at least two through grooves, and the second mounting hole communicates with the corresponding one fifth mounting groove of the at least two fifth mounting grooves.

8. The clamping mechanism of claim 5, wherein the first installation portion defines a pair of engaging grooves and a through hole communicating to the pair of engaging grooves, the first mounting groove communicates with one of the pair of engaging grooves, the driver is mounted in the through hole, and is received in the pair of engaging grooves.

9. The clamping mechanism of claim 1, wherein each of the at least two clamping members defines a latching groove at a side away from the mounting plate, for latching the workpiece.

10. The clamping mechanism of claim 1, wherein the clamping mechanism further comprises a cover mounted on the mounting plate, for covering the reversing member and the at least two transferring members.

11. A clamping mechanism, comprising:
a mounting plate defining four through grooves;
a driving assembly comprising a driver, and a connecting member connected to the driver, the driver mounted on the mounting plate, for driving the connecting member to move toward the driver; and
a clamping assembly comprising:
   a reversing member mounted on the mounting plate;
   four clamping members movably mounted in the four through grooves, respectively;
   four transferring members movably wound on the reversing member, an end of each of the four transferring members connected to the connecting member, an opposite end of each of the four transferring members connected to the corresponding one clamping member of the four clamping members, thereby having the reversing member capable of changing a moving direction of each of the four transferring members; and
   four elastic members sleeved on the four transferring members, and resisting against the four clamping members, respectively,
wherein when the driver moves the connecting member, the connecting member pulls the four transferring members, and thus a pulling force is applied on each of the four clamping members, the four clamping members move toward the reversing member driven by the pulling force, to clamp the workpiece.

12. The clamping mechanism of claim 11, wherein the mounting plate comprises a first installation portion and a second installation portion extending from the first installation portion, the first installation portion is coplanar with the second installation portion, the driver is mounted on the first installation portion, the reversing member and the four clamping members are mounted on the second installation portion.

13. The clamping mechanism of claim 12, wherein the second installation portion comprising a first mounting surface and a second mounting surface opposite to the first mounting surface, the reversing member is mounted on the first mounting surface, the clamping assembly further comprises four linking members respectively connected to the four clamping members, the four linking members are mounted on the first mounting surface respectively received in the four through grooves, the four clamping members are positioned on the second mounting surface respectively corresponding to the four through grooves, each of the four transferring members are connected to the corresponding linking member.

14. The clamping mechanism of claim 13, wherein the four through grooves are stepped grooves, a first assembling surface and second assembling surface parallel to the first assembling surface are formed within each of the four through grooves, the first assembling surface is located closer to the first mounting surface relative to the second assembling surface, the linking member is slidably mounted on the second assembling surface.

15. The clamping mechanism of claim 13, wherein the first mounting surface defines a first mounting groove, a second mounting groove, a third mounting groove, a fourth mounting groove, and four fifth mounting grooves, an end of the first mounting groove is positioned adjacent to the connecting member, the first mounting groove, the second mounting groove, the third mounting groove, and the fourth mounting groove communicate in that order, and are arranged in a line, an end of each of the four fifth mounting grooves communicates with the fourth mounting groove, the four fifth mounting groove are arranged at a periphery of the fourth mounting groove, a bottom surface of the fourth mounting groove defines a first mounting hole, the reversing member is mounted in the first mounting hole, each of the four transferring members is received in the first mounting groove, the second mounting groove, and the third mounting groove, the fourth mounting groove, and the corresponding fifth mounting groove.

16. The clamping mechanism of claim 15, wherein the four fifth mounting grooves are symmetrically arranged at opposite sides of the fourth mounting groove, two opposite fifth mounting grooves of the four fifth mounting grooves are arranged in a first straight line, another two fifth mounting grooves of the four fifth mounting grooves are arranged in a second straight line, and the first straight line intersects with the second straight line, the clamping assembly further comprises an aligning member mounted in the second mounting groove, the aligning member defines a through hole aligning with the first mounting groove and the third mounting groove, the four transferring members are inserted through the through hole.

17. The clamping mechanism of claim 16, wherein the mounting plate defines four second mounting holes respectively communicating with the four fifth mounting grooves and the four through grooves.

18. The clamping mechanism of claim 15, wherein the first installation portion defines a pair of engaging grooves and a through hole communicating the pair of engaging grooves, the first mounting groove communicates with one of the pair of engaging grooves, the driver is mounted in the through hole, and is received in the pair of engaging grooves.

19. The clamping mechanism of claim 11, wherein each of the four clamping members defines a latching groove, for latching the workpiece.

20. The clamping mechanism of claim 11, wherein the clamping mechanism further comprises a cover mounted on the mounting plate, for covering the reversing member and the four transferring members.

* * * * *